United States Patent [19]

Ingelaere

[11] 3,864,672

[45] Feb. 4, 1975

[54] MATRIX STORE WIRING PATTERN

[75] Inventor: Pierre Ingelaere, Evreux, France

[73] Assignee: U.S. Philips Corporation, New York, N.Y.

[22] Filed: July 6, 1973

[21] Appl. No.: 377,070

[30] Foreign Application Priority Data

July 12, 1974 France .............................. 74.25285

[52] U.S. Cl. .................... 340/174 M, 340/174 AC, 340/174 CR, 340/174 NC, 340/174 GP

[51] Int. Cl. ........................... G11c 11/02, G11c 5/02

[58] Field of Search ............ 340/174 AC, 174 CR, 340/174 NC, 174 GP, 174 M

[56] References Cited

UNITED STATES PATENTS

| | | | |
|---|---|---|---|
| 3,201,767 | 8/1965 | Bradley | 340/174 M |
| 3,675,224 | 7/1972 | Ninomiya et al. | 340/174 M |
| 3,681,767 | 8/1972 | Moore | 340/174 M |
| 3,707,705 | 12/1972 | Howell, Jr. | 340/174 M |
| 3,711,839 | 1/1973 | Sell | 340/174 M |

OTHER PUBLICATIONS

IBM Tech. Disc. Bull., "Memory Plane Having Combination Sense-Inhibit Winding," by Constantine, Jr., Vol. 3, No. 1, 6/60, p-45.

*Primary Examiner*—Stanley M. Urynowicz, Jr.
*Attorney, Agent, or Firm*—Frank R. Trifari

[57] ABSTRACT

A store having magnetic elements arranged in columns and rows forming an integer multiple of two fields; each of two sense-inhibit wires couples one half the columns and said wires cross each other between two adjacent fields in the column direction. All elements of a field are orientated along a single diagonal, elements of adjacent fields in the direction of the rows being orientated according to two different diagonals whereas those of adjacent fields in the direction of the columns are orientated according to a single diagonal. The sense-inhibit wires are arranged to form spirals through the fields.

5 Claims, 2 Drawing Figures

MATRIX STORE WIRING PATTERN

The invention relates to a matrix store, comprising toroidal magnetic storage elements which are orientated diagonally and arranged along rows and columns in an integer multiple of four fields, the said storage elements being provided with a row selection wire per row and a column selection wire per column and two sense wires, each sense wire being associated with one half of the columns and being also usable as inhibit wire, the sense wires forming, while crossing each other, at a transition between two fields which adjoin each other in the column direction a bifilar propagation line. There may thus be four, eight . . . . . fields. The storage elements may have a toroidal or a more complex shape, for example, due to the presence of more holes. The meaning of the terms "row" and "column" can be interchanged. A matrix store of this kind is known from the article by T.Gilligan "Four-wire performance from a three-wire memory, etc.," Electronics, Mar. 16, (1970), especially page 107. In the matrix store described therein two successive storage elewments arranged along a row or a column are alternately and orientated according to the first and the second diagonal.

A configuration of this kind has the drawback that, due to the comparatively large thickness of the storage elements, the pitch of rows and columns must be larger than the diameter of the storage elements. It is known to arrange the storage elements such that the orientation does not change after each storage element along a row or a column, but this does not offer a substantial saving of space. In order to achieve a substantial space saving, the invention is characterized in that all storage elements of a field are orientated according to a single diagonal, the storage elements of two fields which adjoin each other in the direction of the rows being orientated according to two different diagonals that in a group of two "lower" and two "higher" fields, as defined herein and which form a rectangle, the sense wires being arranged such that they form spirals having substantially rectangular turns, the widths of which are slightly larger than those of the fields, the said turns consisting of two half-turns which are staggered over one column with respect to each other, the half-turns of a spiral being associated with corresponding columns of the fields of the same order and being staggerd over one column at a transition between fields of different order, successive turns of a spiral being staggered over two columns. The area of a matrix store and the lengths of the row and column selection wires are thus substantially reduced with the result that the selection requires less power.

Furthermore, in contrast thereto in the known store, a sense wire has a meander-like or zig-zag shape instead of that of a spiral. According to the invention the turns substantially overlap each other and are slightly staggered with respect to each other. The width of a turn is approximately equal to that of a field plus the space between two fields.

A highly-conductive metallic film can be deposited in the immediate vicinity of one of the faces of the storage matrix in order to reduce the equivalent inductance of the inhibit and sense wire of the described structure; this metallic film can be formed by the thin copper-plating on an insulating board such as used for the manufacture of printed circuits wherein, and notably by a copper film or the princted circuit board supporting the matrix.

It is alternatively possible to provide a thin metallic layer of good conductivity, made of aluminum or copper, on the upper surface of the matrix, and it is possible to use two metallic films one on each of the surfaces of the matrix.

The fact that all cores of the same field are parallel to each other enables a substantial reduction of the pitch of the cores and offers a substantial saving as regards the area which is occupied by a field of a defined model containing a given number of cores; for example, the known arrangement of cores having a nominal diameter of 0.4572 mm (18 mils) implies a pitch of the cores which is equal to 0.508 mm (20 mils), while the parallel disposition of the cores according to the present invention permits the use of a pitch of 0.381 mm (15 mils) which corresponds, in a first approximation, to a reduction of the area occupied by the core field at a ratio of 4 : 2.25.

Another advantage of the arrangement according to the present invention is that the length and the resistance of the X and Y selection wires are reduced by 25 percent, which results in a corresponding reduction of the power dissipated in these wires for a given current intensity.

The substantial reduction of the area occupied by the matrix enables a reduction of the dimensions of the printed circuit board on which the matrix is accommodated and which serves for the necessary interconnections, or the accommodation of a store of twice the capacity on a printed circuit board of the given dimensions.

The invention will be described in detail hereinafter with reference to the drawing.

Figure 1:
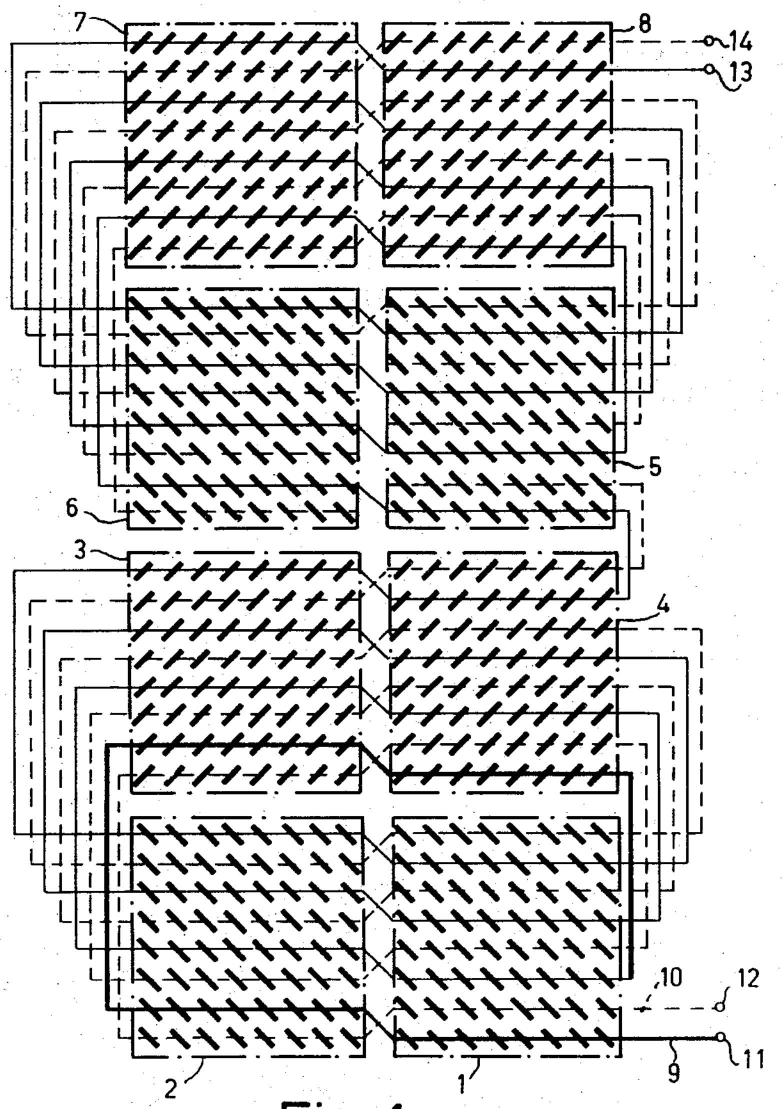
FIG. 1 is a diagrammatic plan view of a storage matrix according to the invention.

FIG. 1 shows a diagram of a matrix store according to the invention which comprises eight fields, i.e., four "lower" or upper fields 1, 4, 5 and 8, and four "higher" fields 2, 3, 6 and 7, which are enclosed by stroke-dot lines. The fields comprise eight rows of eight storage elements each, but the invention is not restricted to these numbers. The number of fields can alternatively amount to four (2 × 2), 16 (2 × 8 or 4 × 4), or another multiple of four. The row and column selection wires are omitted in the drawing for the sake of simplicity.

The cores in the fields 1 and 2 are arranged to be parallel to each other and are 45° inclined with respect to the horizontal selection wires (not shown); the cores in the fields 3 and 4 are also arranged to be parallel to each other and are 135° inclined with respect to the horizontal selection wires (not shown); the arrangement of the cores of the fields 5 and 6 is identical to that of the fields 1 and 2; the arrangement of the cores of the fields 7 and 8 is identical to that of the fields 3 and 4.

Two sense inhibit half-lines, denoted by the references 9 and 10 of the figure, are arranged between a half-line input terminal 11 and a half-line output terminal 13, on the one side and between a half-line input terminal 12 and a half-line output terminal 14, respectively, on the other side.

In order to define the traject of the two sense half-lines 9 and 10, the columns of each of the fields will be denoted by their order, proceeding from left to right in the relevant field.

Starting from the terminal 11, the wire of the half-line 9 passes through the cores of the first column of the field 1, and subsequently through the cores of the second column of the field 2. From the upper part of the second column of the field 2, the wire passes to the upper part of the second column of the field 3, from the output of which it subsequently passes through the cores of the first column of the field 4. From the lower part of the first column of the field 4, the wire passes to and through the lower part of the third column of the field 1 and from there it passes to the fourth column of the field 2. For better visibility of the traject followed till the input of the third column of the field 1, this traject is denoted by a heavy line in the FIG. 1. From the input of the third column of the field 1, the traject of the wire of the half-line 9 is as follows: field 1, 3rd column — field 2, 4th column — field 3, 4th column — field 4, 3rd column — field 1, 5th column — field 2, 6th column — field 3, 6th column — field 4, 5th column — field 1, 7th column — field 2, 8th column—field 3, 8th column — field 4, 7th column.

From the output of the 7th column of field 4, the wire passes to the lower part of the first column of field 5; in this group of four core fields 5, 6, 7 and 8, the wire of the half-line 9 passes through the various core columns according to a traject which is identical to that described above for the first group of four fields, this traject terminating on the terminal 13.

The traject of the half-line 10 is comparable to that of the half-line 9 which it overlaps. From the terminal 12, the traject of the wire of the half-line 10 is as follows:
field 1, 2nd column — field 2, lst column —field 3, 1st column — field 4, 2nd column —field 1, 4th column — field 2, 3rd column —field 3, 3rd column — field 4, 4th column —field 1, 6rd column — field 2, 5th column —field 3, 5th column — field 4, 6th column —field 1, 8th column — field 2, 7th column —field 3, 7th column — field 4, 8th column.

From the output of the last column of the field 4 the wire passes to the lower part of the second column of the field 5; in the group of four core fields 5, 6, 7 and 8, the wire of the half-line 10 passes through the various core columns according to a traject which is identical to the one just described for the first group of four fields, the traject terminating on the terminal 14.

As is clearly shown in FIG. 1, the wires which constitute each of the half-lines 9 and 10 cross each other at each passage from an upper field to a lower field (and vice versa) which is accompanied by a change of column.

In the example shown in FIG. 1, the cores of the upper fields have an orientation which is identical to that of the cores of the lower fields situated therebelow; this arrangement is not exclusive and the two orientations may differ upon the passage from a lower core field to the corresponding upper core field.

Figure 2:
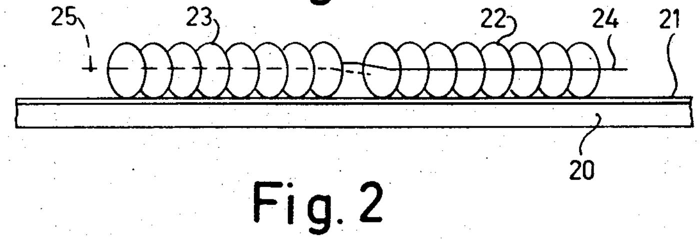
FIG. 2 is a diagrammatic side elevation of the matrix of FIG. 1.

The side elevation in FIG. 2 shows an insulating board 20 of the type supporting what are referred to as printed circuits and provided with a thin plate of copper 21. The insulating board 20 serves to support the matrix according to the invention, two core columns 22 and 23 being visible in FIG. 2. The core column 22 is, for example, the first core column of the field 1 of FIG. 1, and the column 23 is, for example, the first core column of the field 2 of FIG. 1. A wire segment 24, denoted by an uninterrupted line, is a segment of the half-line 9 which is diagrammatically shown. A second wire segment 25, shown in the form of a broken line, is a segment of the half-line 10 which is diagrammatically shown.

According to this disposition, the thin copper layer 21 is arranged in the immediate vicinity of the core matrix and the half-lines 9 and 10.

Thanks to the presence of at least one highly-conductive layer such as 21 in the immediate vicinity of at least one of the surface of the matrix, the equivalent inductance of the half-line 9 and 10 used as inhibit line has a value such that the ratio L/R of these lines permits of a sufficiently short rise time of the inhibit current.

The described store can form part of a stack of corresponding stores which is of the general 3D 3-wire type.

What is claimed is:

1. A matrix store, comprising toroidal magnetic storage elements arranged in arrays of rows and columns each array comprising a plurality of rectangular fields each side of said array comprising an integer multiple of two fields, said storage elements in each field being oriented diagonally with respect to said rows and columns and provided with a row selection wire per row and a column selection wire per column and two sense wires, a first plurality of said fields operatively responsive to a first plurality of adjacent row selection wires being identified as higher fields, a second plurality of said fields operatively responsive to a second plurality of adjacent row selection wires being identified as lower fields, each of said sense wires being operatively responsive to one half of the columns of each field said sense wires forming, while crossing each other, at a transition between a higher and lower field, respectively which adjoin each other in the column direction, a bipolar propagation line, all of said storage elements within a field being orientated parallel to a single diagonal to said columns and rows, said storage elements of two fields which adjoin each other in the direction of said rows being orientated according to two different diagonals to said columns and rows, said sense wires being arranged such that they form a spiral having substantially right angle turns, the widths of said turns being substantially equal to the width of said fields in the direction of the rows and consisting of two half-turns which are staggered in each turn with respect to each other, one of said half turns extending between identically sequenced columns in adjacent higher fields, and the other of said half turns extending between columns of different sequence than said one half turn, successive turns overlapping preceding and succeeding turns.

2. A matrix store as claimed in claim 1, characterized in that at least one conductive metallic layer is arranged proximate to the plane of the storage elements.

3. A matrix store as in claim 1 wherein said sense wires include means for inhibiting said storage elements to which said sense wire is responsive to operatively.

4. A matrix store as in claim 1 wherein said width or turns are equal to said width of said field plus the distance between the fields through which said turn extends.

5. A matrix store as in claim 4 wherein an insulating board having an electrically conductive plating disposed thereon is provided for supporting said matrix store.

* * * * *

PO-1050
(5/69)

UNITED STATES PATENT OFFICE
CERTIFICATE OF CORRECTION

Patent No. 3864672 Dated February 4, 1975

Inventor(s) PIERRE INGELAERE

It is certified that error appears in the above-identified patent and that said Letters Patent are hereby corrected as shown below:

In the title: The Foreign Application Priority Data should be

--July 12, 1972 France.........7225285--

Col. 1, line 22, "elewments" should be --elements--

Signed and sealed this 24th day of June 1975.

(SEAL)
Attest:

RUTH C. MASON
Attesting Officer

C. MARSHALL DANN
Commissioner of Patents
and Trademarks